United States Patent [19]

Milanes et al.

[11] 4,397,460

[45] Aug. 9, 1983

[54] OVERLAPPED DOCUMENT DETECTOR

[75] Inventors: Eddy J. Milanes; Russell E. Highbridge, both of Oklahoma City; Robert S. Morgan, Yukon, all of Okla.

[73] Assignee: Magnetic Peripherals Inc., Minneapolis, Minn.

[21] Appl. No.: 280,756

[22] Filed: Jul. 6, 1981

[51] Int. Cl.³ .......................... B65H 7/12; B65H 7/14
[52] U.S. Cl. .................................. 271/263; 271/284; 250/223 R
[58] Field of Search ............... 271/97, 258, 259, 260, 271/262, 263, 280, 281, 282, 283, 284, 285, 286; 250/222.1, 222.2, 223

[56] References Cited

U.S. PATENT DOCUMENTS

| | | | |
|---|---|---|---|
| 2,441,912 | 5/1948 | Streich | 271/284 |
| 2,906,189 | 9/1959 | Robertson | 271/283 |
| 3,040,866 | 6/1962 | Rehm | 271/284 |
| 3,186,708 | 6/1965 | Hinz | 271/263 |
| 3,278,754 | 10/1966 | Wallace | 250/223 |
| 4,160,546 | 7/1976 | McMillan et al. | 271/263 |

Primary Examiner—Bruce H. Stoner, Jr.
Assistant Examiner—Donald Hajec
Attorney, Agent, or Firm—R. M. Angus; Joseph A. Genovese

[57] ABSTRACT

An overlapped document detector for a document handling apparatus comprises an air knife in the primary document path to separate overlapped documents and forward them along separate ones of two secondary paths. Optical detectors focused on each secondary path, detects documents to detect an overlapped condition. A vacuum is created to maintain the documents in their respective secondary paths for detection purposes.

8 Claims, 6 Drawing Figures

OVERLAPPED DOCUMENT DETECTOR

This invention relates to a double document detector, and particularly to apparatus for separation and detection of overlapped documents in a document handling machine.

Document handling equipment is useful in conjunction with data processing equipment for reading and sorting documents such as bank checks, deposit slips, bills, stubs, etc. In a typical document handling machine, the documents to be read and sorted are placed in an input hopper and are individually fed from the hopper along a document path. The documents are accelerated to a nominal running speed to thereby produce a gap between successive documents, and information contained on the documents is read. For example, such information could be in the form of magnetic encoded data, magnetic ink characters, optical characters, punched holes, etc. The document handling equipment ordinarily includes a plurality of sorting pockets which are selectively actuated in accordance with the information read from the document. Therefor, the documents are sorted into different pockets in accordance with the information on the documents. Occasionally, however, documents are fed in a partial or complete overlapped condition thereby resulting in errors in the reading of the document and improper pocketing.

In the past, several techniques have been utilized for detecting overlapped documents in document handling machines. One technique, for example, required documents of a specified size. Gauging apparatus measured the size of each document before being read, but if two or more documents were partially overlapped the gauging apparatus would sense an apparent oversize and reject the document. The problem with this technique was that it could not be used with documents of differing sizes. Also, the gauging technique could not sense two documents that were completely overlapped, since there would be no apparent oversize.

Another technique required the use of documents of the same transmissive optical density. Light transmitted through the documents was compared against a standard so that if a significant change in the transmitted light through successive documents occurred, the machine would assume that two or more documents were overlapped. One difficulty with the optical transmissive techqnique is that the document handling machine could not reliably handle documents having large differences in transmissive optical densities.

In the banking industry, it is typical to find documents having lengths between 4.75 and 8.75 inches, thicknesses of between 2.5 and 9 mils, and optical transmissive density variations as large as 32 to 1. Consequently, to adequately serve the needs of the banking industry, among others, a need exists for a system to detect the presence of partial and completely overlapped documents regardless of differences of length, thickness, optical transmissiveness, etc. among the documents.

Another technique for separating and detecting overlapped documents employed the use of an air knife or jet to separate the leading edges of overlapped documents to cause the documents to flow along two respective paths. Vacuum sensors in the wall of the machine included ports which were closed by the documents as they passed by the ports. Thus, if two or more documents were overlapped, the air jet separated the documents and the ports of both document paths would be closed simultaneously thereby indicating the presence of overlapped document. Examples of the vacuum sensing technique may be found in U.S. Pat. Nos. 2,992,822; 2,994,528; 3,504,911; 3,589,714 and 3,773,321. One of the problems associated with the vacuum technique resided in the fact that to adequately sense the document, the document must adequately close the vacuum port in the wall of the machine. However, to prevent impeding the movement of the document, a vacuum could not be so strong as to hold the document against the wall. Thus, it was necessary to adjust the vacuum strength between one strong enough to detect the presence of the document yet weak enough so as not to impede document movement. In practice, however, the ability to close the ports had to be sacrificed in favor of document movement, or vice versa. Thus, it was difficult to adequately maintain the vacuum so as to provide adequate detection of the document without impeding its travel. Furthermore, the vacuum technique required the document to travel past the vacuum ports at a substantially uniform distance from the ports. However, this was not altogether realizable with documents of varying thicknesses and densities. Consequently, the vacuum technique was not altogether suitable for detecting overlapped documents in a document handling machine capable of handling differing sizes and weights of documents.

It is an object of the present invention to provide an overlapped document detector for a document handling machine wherein overlapped documents are separated and detected without relying on any characteristic of the document itself.

It is another object of the present invention to provide an overlapped document detector for a document handling machine capable of detecting overlapped documents regardless of size, weight, density, optical transmissivity, optical reflectivity, etc.

It is another object of the present invention to provide an overlapped document detector for a document handling machine which separates the documents into a plurality of paths and detects documents in each of those paths, yet permits the documents to travel along their nominal paths.

In accordance with the present invention, an overlapped document detector includes an air knife to separate the leading edges of overlapped documents and to forward the overlapped documents along a plurality of nominal document paths. Optical detection means focused on the document paths sense the presence of a document in each nominal path so that if documents are in both paths, an overlapped condition is sensed.

One feature of the present invention resides in the provision of a pair of optical sensors for each document path, the pair of sensors being focused on each nominal path from opposite directions to detect opposite sides of the document. Signals from the sensors are summed and divided to provide a threshold signal. If the signal from the sensor closest to the corresponding document path is lower than a threshold signal, document detection is effectuated. If both sensor pairs detect documents in the respective paths, an overlapped document condition is detected, so the documents may be moved to a reject pocket.

The above and other features of this invention will be more fully understood from the following detailed description and the accompanying drawings, in which:

Figure 1:
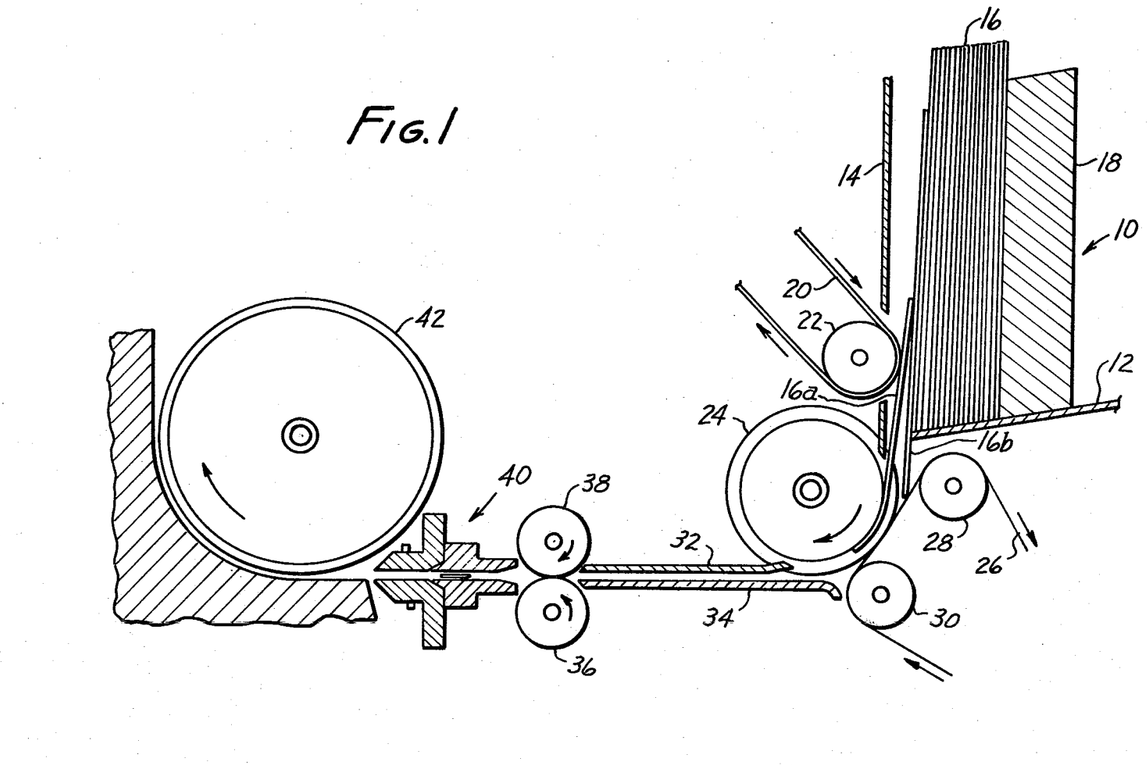
FIG. 1 is a schematic representation of a portion of a document handling machine having an overlapped document detector in accordance with the presently preferred embodiment of the present invention.

With reference to the drawings, and particularly to FIG. 1, there is illustrated a document handling apparatus. The apparatus includes an input hopper 10 having a lower trough 12 and an end wall 14. Documents 16 are stacked in the hopper 10 so that an edge is supported by trough 12 and weight 18 urges documents 16 toward wall 14. Picker belt 20 is trained around pulley 22 to engage the forwardmost document 16a to forward the same to separator tire 24. A counter-rotating reverse belt 26 is trained around pulleys 28 and 30 to impede movement of the next following document 16b. The operation of the input hopper, picker belt, separator tire, and reverse belt is such as to pick off the documents in hopper 10 one at a time and forward them to the document path defined between plates 32 and 34. The reverse belt, which rotates about pulleys in the direction of the arrows shown, serves to inhibit the next following document from traveling along the document path until the first document has cleared the separator tire.

The documents traveling along the document path are then accelerated by intermediate accelerator drive rollers 36 and 38. The function of the intermediate accelerated drive rollers is to accelerate the speed of travel of the documents to an intermediate speed to thereby create a gap between successive documents. The documents are thereafter forwarded to the ovelapped document separator and detector 40, and thereafter to a final accelerator roller 42 which accelerates the documents to final transport speed. Thereafter, the documents may be read and sorted in a manner well known in the art.

Figure 2:
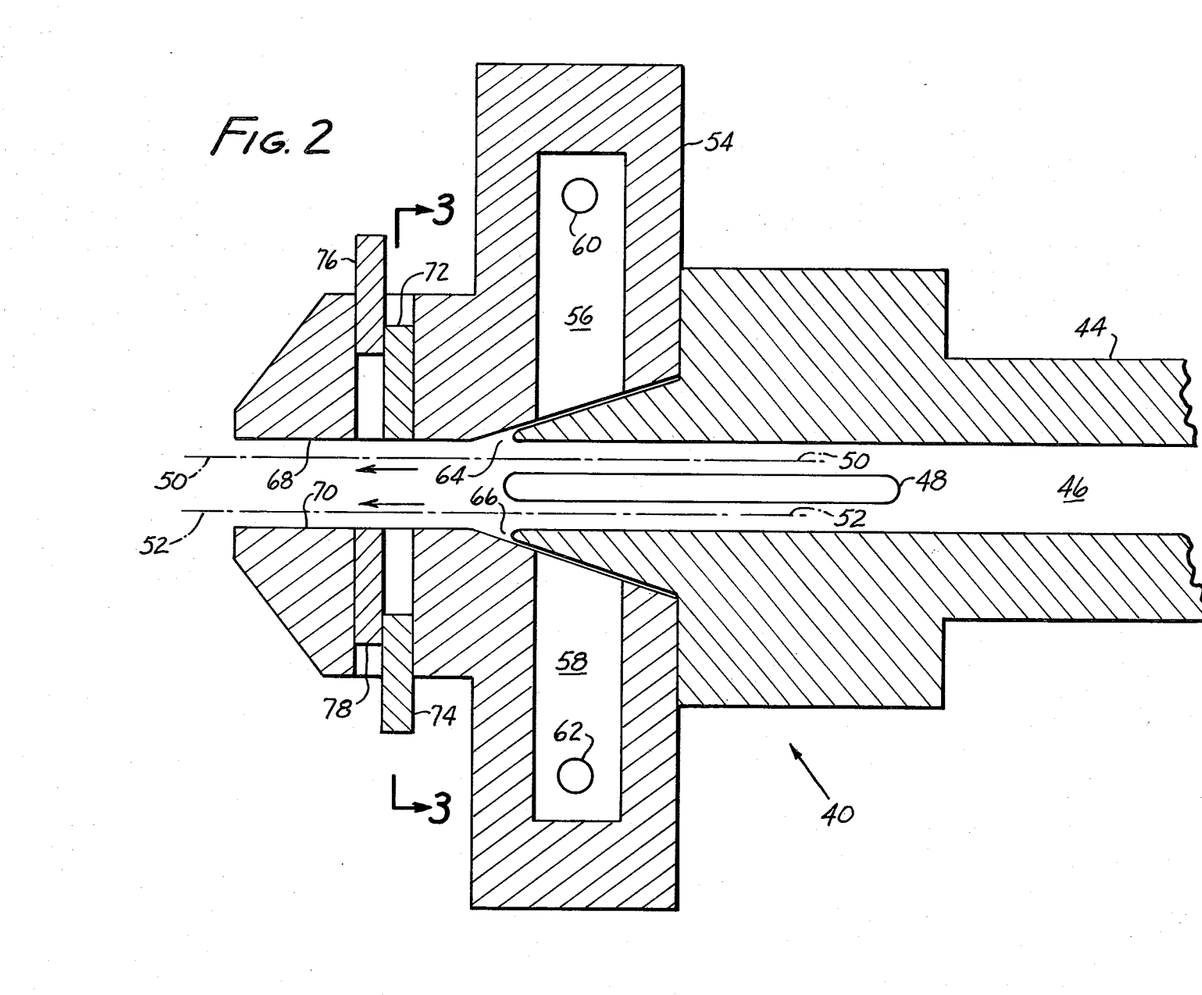
FIG. 2 is a section view of an overlapped document detector, including means for separating overlapped documents.

With reference to FIG. 2, there is illustrated an overlapped document separator and detector 40 in accordance with the presently preferred embodiment of the present invention. The separator/detector 40 includes a housing 44 which deforms a document path 46 to receive documents from the intermediate accelerator drive rollers 36 and 38. An air knife is disposed in path 46 so that documents in path 46 must follow either of nominal document paths defined between nominal plane 50 and surface 68 and between nominal plane 52 and surface 70. The air knife comprises a port 48 through which air under pressure is admitted in a direction perpendicular to the direction of document travel to separate overlapped documents in path 46. An exit port 49 (FIG. 3) is positioned opposite port 48 to permit exhaust of air admitted through port 48. Exit port 48 preferably extends the full length of housings 44 and 54 to permit exhaust of air from the air knife, and to permit access to the document path to remove documents. Housing 54 is fastened to housing 44 and includes a chamber 56, 58 and air inlet ports 60 and 62. Air jets 64 and 66 are formed between housings 44 and 54 so as to permit air to escape at high velocity from cavities 56 and 58 into the region of the document paths.

Air is admitted under pressure through ports 60 and 62 to chambers 56 and 58 and allowed to escape through jets 64 and 66. Since the air escapes at a relatively high velocity, the pressure of that air is relatively low, and below atmospheric pressure. When a document is in either of the nominal document paths, the low pressure air from the air jet forms a partial vacuum between the document and the respective walls 68 or 70. Thus, the document is maintained in the region between the respective wall 68 or 70 and the nominal document path between surface 68 or 70 and nominal plane 50 or 52. At the same time, the air jet forms a decrease in air pressure along the document paths upstream toward the forward end of the air knife formed by air passing through port 48. This decreased pressure in the nominal paths, coupled with air blown perpendicular to the direction of document travel by the air knife, serves to separate the leading edges of overlapped documents causing two or more documents to be separated into the separate document paths between surface 68 and plane 50 and between surface 70 and plane 52. Therefore, if two overlapped documents are traveling in path 46, air directed by the air knife through port 48 will cause the leading edges of the documents to separate, and the documents will be directed to follow the respective paths. As the documents pass jets 64 and 66, they are pulled by the vacuum formed by those air jets to continue along their respective paths. Downstream of jets 64 and 66 are a plurality of sensor assemblies 72, 74, 76 and 78.

Figure 3:
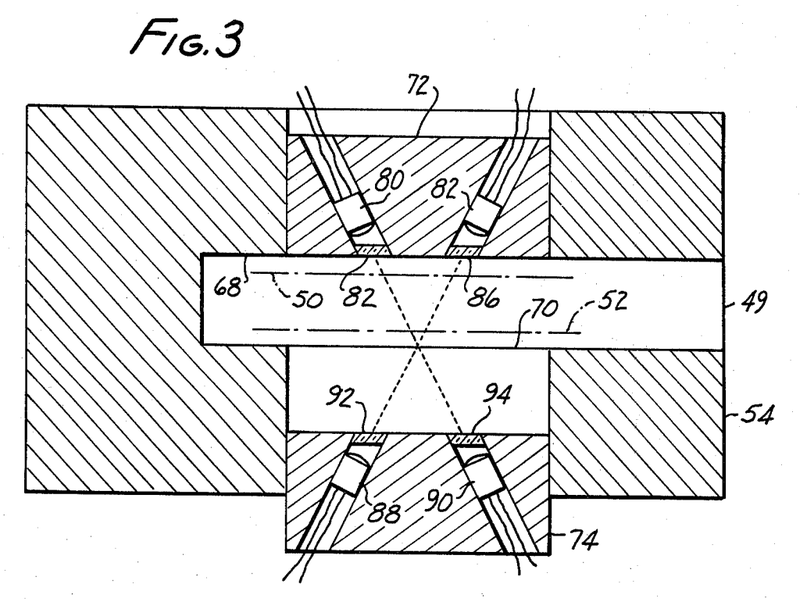
FIG. 3 is a section view taken along line 3—3 in FIG. 2 showing the details of the optical sensors for detecting a document in one path.

FIG. 3 is a section view taken along line 3—3 in FIG. 2 showing a section of two of the four optical sensors for detecting a documents in paths defined between surface 68 and nominal plane 50 and between surface 70 and nominal plane 52. Thus, FIG. 3 shows a section of sensor assemblies 72 and 74; it being recognized that the sensor assemblies 76 and 78 are essentially identical thereto. Sensor assembly 72 comprises a light emitting diode 80 and a phototransistor sensor 82 arranged to focus on a spot on the plane of surface 70. Dust shields 84 and 86 serve to protect diode 80 and sensor 82 from paper dust and other contaminents in the document path. Similarly, light emitting diode 90 and phototransistor sensor 88 of assembly 74 are arranged to focus on a spot on the plane of surface 70. Dust shields 92 and 94 protect diode 88 and sensor 90 from dust and other contaminants.

Similarly, sensor assemblies 76 and 78 have light emitting diode and phototransistor sensor pairs, each focused on a spot on the plane of surface 68. Therefore, each nominal document path has two sensor assemblies, each focused on the plane of the respective surface forming one of the boundaries of the nominal document path; each sensor assembly being directed at the focus plane from opposite sides thereof. It should be noted that while the sensor assemblies are focused on the approximate plane of wall surfaces 68 and 70, in reality there is no wall surface present at the spot of focus. Also, while light infrared sensors and emitters are preferred, visible light and other radiant detectors and emitters may be used.

Figure 4:
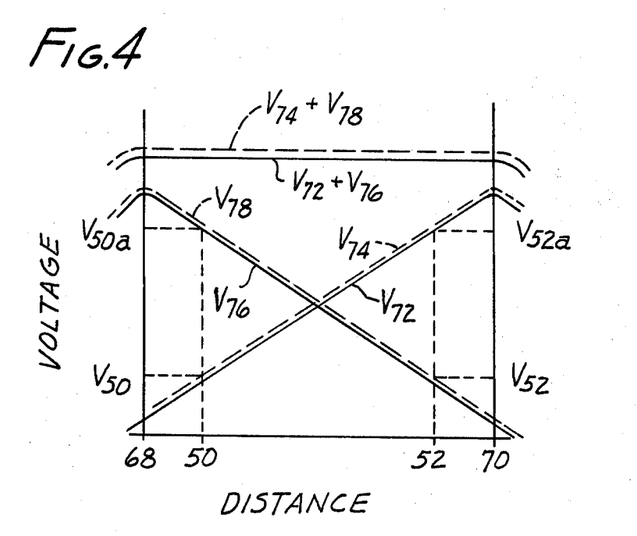
FIG. 4 is an illustration voltage diagram useful in explaining operation of the optical sensor illustrated in FIG. 3.

With reference to FIGS. 3 and 4, assume a document is present along nominal document path between surface 70 and nominal plane 52 in the region of sensor assemblies 72 and 74. Light from the diodes of the sensor assemblies is reflected off the surfaces of the document in the path causing the associated phototransistors to generate a current representative of the amount of light so reflected. If the document were at surface 70, the voltage $V_{72}$ across a resistor in parallel with sensor 72 would be at a maximum, and the voltage $V_{74}$ across a resistor in parallel with the phototransistor of sensor assembly 74 would also be at a maximum. Also, with a document at surface 70 (and no document at or near surface 68), the voltage $V_{76}$ associated with sensor assembly 76 and voltage $V_{78}$ associated with sensor assembly 78 would be at a minimum. Conversely, if the document were at surface 68, voltage $V_{76}$ and $V_{78}$ would be at a maximum whereas the voltages $V_{72}$ and $V_{74}$ would be at a minimum. It will be appreciated that $V_{72}$ and $V_{74}$ follow essentially the same waveform, with a peak at surface 70, whereas $V_{76}$ and $V_{78}$ are essentially identical, with a peak at surface 68. Therefore, as shown in FIG. 4, the sums of the voltages $V_{72}+V_{76}$ and $V_{74}+V_{78}$ remain relatively constant regardless of the position of the document between surfaces 68 and 70.

While the explanation given above in connection with FIG. 4 concerns detection of a document between nominal plane 52 and surface 70, similar result occurs in connection with sensor assemblies 76 and 78 in sensing a document between nominal plane 50 and surface 68.

Figure 5:
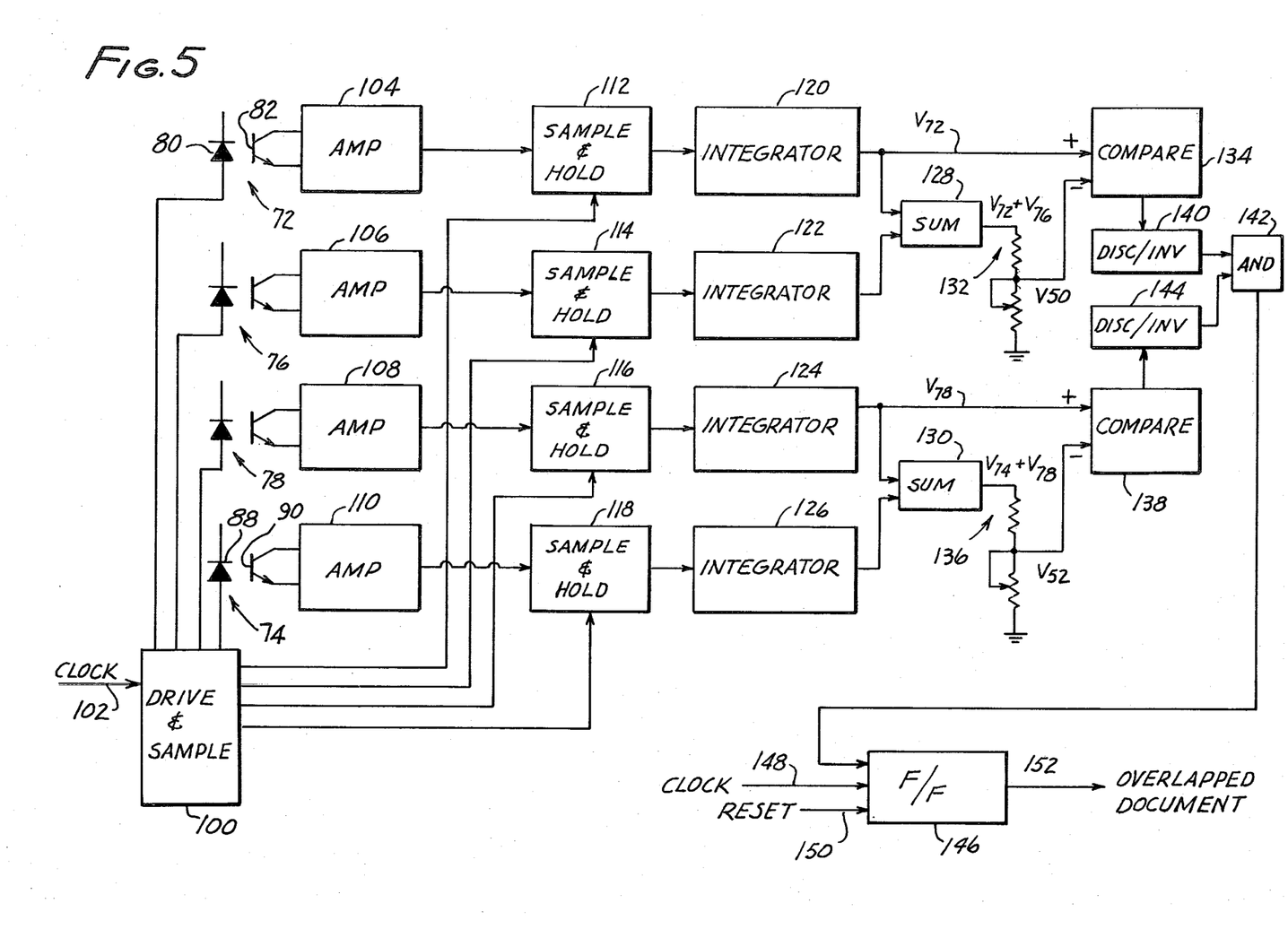
FIG. 5 is a block circuit diagram of apparatus for processing signals from the optical sensors.

FIG. 5 is a block circuit diagram of a circuit for processing signals from sensor assemblies 72, 74, 76 and 78. A four phase sampling drive clock system 100 is driven by a clock signal via input 102 to provide drive signals to light emitting diodes 80, 88, etc. of sensor assemblies 72, 74, 76 and 78. Phototransistors 82, 90, etc. of the sensor assemblies provide voltage signal inputs to amplifiers 104, 106, 108 and 110; the phototransistor of sensor assembly 72 providing an input to amplifier 104, the phototransistor of sensor assembly 76 providing an input to amplifier 106, the phototransistor sensor of assembly 78 providing an input to amplifier 108 and the phototransistor of sensor assembly 74 providing an input to amplifier 110. Amplifier 104, 106, 108 and 110 provide inputs to sample and hold circuits 112, 114, 116, and 118, respectively. Sample rate signals are provided to each of the sample and hold circuits via the four phase sample and drive clock system 100. The outputs of sample and hold circuits 112, 114, 116 and 118 are provided to integrator circuits 120, 122, 124 and 126. The outputs of integrators 120 and 122 provide inputs to a first gate preparation means which include a first threshold means and first compare means 134. The first threshold means comprises first summing means 128 and first divider means 132. The outputs of integrator circuits 124 and 126 provide inputs to second gate preparation means which include a second threshold means and second compare means 138. The second threshold means comprises second summing means 130 and second divider means 136. Summing circuit 128 adds the signal inputs from integrators 120 and 122 and provides an output through voltage divider 132 to the negative input of compare circuit 134. Summing circuit 130 adds the signals from integrators 124 and 126 and provides an output through voltage divider 136 to the negative input of compare circuit 138. The positive input of compare circuit 134 is provided directly from integrator 120, and the positive input to compare circuit 138 is provided by the output of integrator 124. Compare circuit 134 provides an input to discriminator-inverter 140 which in turn provides a first input or first gate signal to AND gate 142, whereas the output of compare circuitf 138 provides an input to discriminator-inverter 144 to provide a second input or second gate signal to AND gate 142. The output of AND gate 142 is provided to the set input of flip-flop 146. Flip-flop 146 also has a clock input 148 and a reset input 150. Flip-flop 146 has an output 152 which provides a signal indicative of an overlapped document condition.

Figure 6:
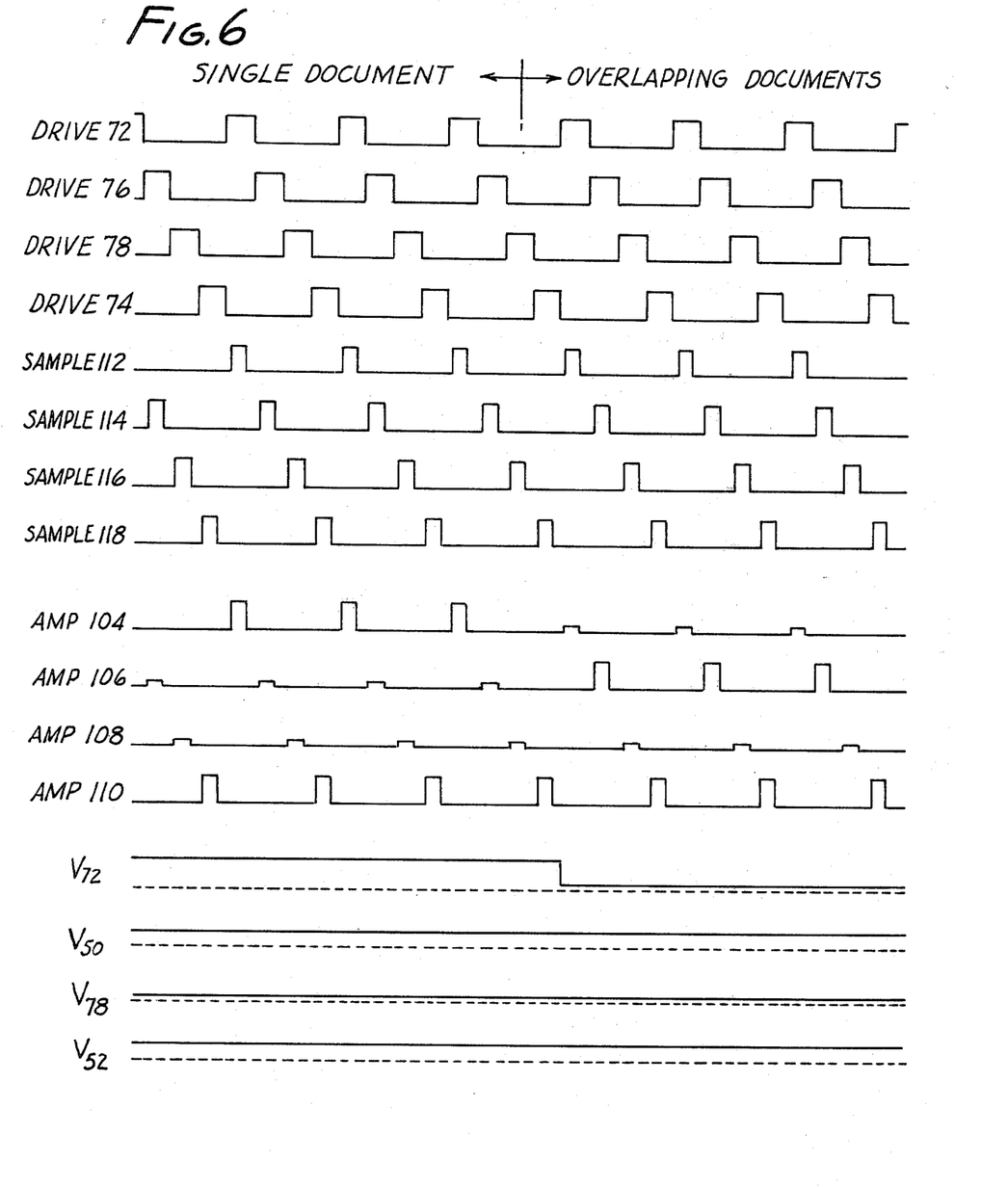
FIG. 6 sets forth waveform diagrams illustrating signal waveforms at various points in FIG. 5.

With reference to FIG. 6, the operation of the circuit illustrated in FIG. 5 may now be explained. As shown in FIG. 6 the drive and sample system provides non-overlapping pulse drive signals to each of the sensors, the drive signal for each sensor being illustrated as drive 72, drive 76, drive 78 and drive 74, respectively. The drive and sample system 100 also provides sample pulses, coincident with the corresponding drive pulses for each of the respective sample and hold circuits 112, 114, 116 and 118.

Assume initially that a document appears in the document path between surface 70 and nominal plane 52, but that no document appears in the opposite document path between surface 68 and nominal plane 50. Consequently, when the respective light emitting diodes are driven by drive signals from the drive and sample system 100, a high amount of light is reflected onto the diodes of sensors 72 and 74, but very little light is reflected onto the diodes of sensor assemblies 76 and 78. Hence, and with reference to FIG. 4, the voltage $V_{72}$ and $V_{74}$ will be relatively high, whereas the voltages $V_{76}$ and $V_{78}$ will be relatively low. However, the sums of the voltages, $V_{72}+V_{76}$ and $V_{74}+V_{78}$ will be relatively high. This is reflected in FIG. 6 by relatively high signals at the outputs of amplifiers 104 and 110 and relatively low outputs at the outputs of amplifiers 106 and 108. Thus, sample and hold circuits 112, 114, 116 and 118 sample the pulse voltage signals from amplifiers 104, 106, 108 and 110, and integrators 120, 122, 124 and 126 integrate the signals to provide signals indicative of the voltage level of signals $V_{72}$, $V_{76}$, $V_{78}$ and $V_{74}$, respectively, at the position of the document.

With a document between surface 70 and plane 52 (and no document between surface 68 and plane 50), the voltage sums $V_{72}+V_{76}$ and $V_{74}+V_{78}$ will be relatively high (due to the high values of $V_{72}$ and $V_{74}$) so when divided by voltage dividers 132 and 136, voltage signals $V_{52}$ and $V_{50}$ are derived representative of the voltage of signal $V_{78}$ at nominal plane 52 and the voltage of signal $V_{72}$ at nominal plane 50. See FIG. 4. However, as shown in FIG. 6, $V_{78}$ is substantially smaller than $V_{52}$ (indicative that the document is in the region between surface 70 and nominal plane 52), and $V_{72}$ is substantially greater than $V_{50}$ (indicative that the document is outside the region between surface 68 and nominal plane 50). Since the output $V_{78}$ of integrator 124 is relatively low compared to the output of voltage divider 136, compare circuit 138 produces a logical zero signal due to the larger signal $V_{52}$ at the negative input of compare circuit 138. Discriminator 144 discriminates that signal through a time delay, inverts it, and provides a logical one signal to AND gate 142 indicative of the presence of a document between surface 70 and nominal plane 52. Also, since the output $V_{72}$ of integrator 120 is greater than $V_{50}$, compare circuit 134 produces a logical one output to circuit 140, so a logical zero signal is provided to the other input of AND gate 142. Consequently, AND gate is not operated to set flip-flop 146.

At a later time (as shown in the right-hand portion of FIG. 6), a document in path between surface 68 and plane 50 is detected. Since a document adjacent surface 68 will effectively block light from being focused by sensor 72 on the document adjacent surface 70, and since the document adjacent surface 70 will effectively block light from being focused by sensor 78 on the document adjacent surface, the signals from amplifiers 104 and 108 will both be low. However, sensors 74 and 76 will produce relatively high signals so the signals from amplifiers 106 and 110 will be high. As a result, and referring to FIG. 6, the values of signals $V_{50}$ and $V_{52}$ remain essentially unchanged, but the value of signal $V_{72}$ is substantially smaller than $V_{50}$. As a result, with $V_{72}$ smaller than $V_{50}$ (indicative of a document between surface 68 and nominal plane 50), a logical zero output is produced by compare circuit 134. Also, with $V_{78}$ smaller than $V_{52}$ (indicative of a document between surface 70 and nominal plane 52), a logical zero output is produced by compare circuit 138. Consequently, logical one signals are impressed on both inputs of AND gate 142 to thereby operate the AND gate.

With AND gate 142 operated, flip-flop 146 is operated to a set condition to provide a signal on output 152 indicative of an overlapped document condition. The signal on output 152 may, for example, stop the feeding of documents into the document sorter and operate the pocket gates (not shown) downstream of the reader to cause the overlapped documents to be rejected.

As described above, the principal detection sensors, against which the threshold signals are compared, are sensors 72 and 78. However, if desired, the principal detection sensors may be sensors 74 and 76 (in which case sensors 72 and 76 and sensors 74 and 78 are reversed in FIG. 5) and the threshold levels should be adjusted to $V_{50a}$ and $V_{52a}$ in FIG. 4.

One feature of the present invention resides in the fact that if a document appears in the region between nominal planes 50 and 52 it will still be detected and no false indication will occur. Thus, signals $V_{72}$ and $V_{78}$ will, under such circumstances, be greater than the respective threshold signals provided by $V_{50}$ and $V_{52}$ to set both compare circuits 134 and 138 at logical ones, thereby providing logical zeros to both inputs of AND gate 142.

Another feature of the invention resides in the fact that the four-phase drive clock system 100 effectively drives each sensor assembly at a separate time, thereby precluding interference between the sensors.

As described above, the output of compare circuits 134 and 138 are provided to discriminator-inverter circuits 140 and 142. One feature of the discriminator function of circuits 140 and 142 is to provide a short time delay to be certain that each document detection remain in the respective detection zones for a predetermined time period before generating a negative signal for the inverter portion of the circuit. This insures that the compare signal output be low for some predetermined period of time so as to discriminate against folds and wrinkles in a document that may actually encroach on the other document path. For example, a folded document passing between surface 70 and plane 52 might, for an instant, also be detected by the sensor assemblies of the path between surface 68 and plane 50. The discriminator circuits assure that a false overlapped document indication will not be indicated simply because a document is overlapped or wrinkled.

One feature of the present invention resides in the fact that document detection is accomplished without regard to the color of a document. Thus, documents whose color reduces reflectivity of light are nontheless detected as easily as documents whose color provides a high reflectivity of light. In this respect, documents with lower reflectivity characteristics will produce voltage waveforms as shown in FIG. 4, but with lower amplitudes. Document detection, being accomplished by detection of the relative values of reflections with respect to equally reduced sums, is therefore independent of the reflective properties of the documents.

Another feature of the present invention resides in the fact that document thickness is not material to document detection. A false document detection will not be accomplished on any document having a side lying between the nominal planes 50 and 52. This is true because the system can detect documents in that region, and because the mechanical separatives of planes 50 and 52 is greater than the thickness of a document.

The present invention thus provides an overlapped document detector which is reliable and rugged in use. The detector detects overlapped documents and discriminates between a mere wrinkled or folded document and a true overlapped condition.

This invention is not to be limited by the embodiment shown in the drawings and described in the description, which is given by way of example and not of limitation, but only in accordance with the scope of the appended claims.

What is claimed is:

1. An overlapped document detector for detecting documents in each of two paths along which documents may travel in a document handling machine comprising, in combination, first and fourth radiant sensor means focused to receive radiation reflected from opposite sides of a document in a first of said paths, and second and third radiant sensor means focused to receive radiation reflected from opposite sides of a document in a second of said paths, said first radiant sensor means being so disposed and arranged adjacent said second path as to receive radiation reflected from documents in said first path only when no document is present in said second path, and said third radiant sensor means being so disposed and arranged adjacent said first path as to receive radiation reflected from documents in said second path only when no document is present in said first path; first gate preparation means responsive to said first and second radiant sensor means for providing a first gate signal; second gate preparation means responsive to said third and fourth radiant sensor means for providing a second gate signal; and gate means responsive to said first and second gate signals for providing a signal indicative of an overlapped document condition.

2. Apparatus according to claim 1 wherein said first gate preparation means includes first threshold means for establishing a first threshold signal based on the sum of the signals produced by said first and second radiant sensor means, and first compare means responsive to the first threshold signal and the signal produced by said first radiant sensor means for providing said first gate signal when the signal from said first radiant sensor means is no greater than the first threshold signal, and said second gate preparation means inclues second threshold means for establishing a second threshold signal based on the sum of the signals produced by said third and fourth radiant sensor means, and second compare means responsive to the second threshold signal and the signal produced by said third radiant sensor means for providing said second gate signal when the signal from third radiant sensor means is no greater than the second threshold signal.

3. Apparatus according to claim 2 wherein said first threshold means comprises first summing means for summing the signals provided by said first and second radiant sensor means, and first divider means for dividing the signal summed by said first summing means, said first divider means providing a signal representative of said first threshold signal, and wherein said second threshold means comprises second summing means for summing the signals provided by said third and fourth radiant sensor means, and second divider means for dividing the signal summed by said second summing means, said second divider means providing a signal representative of said second threshold signal.

4. Apparatus according to any of claims 1, 2 or 3 wherein said first and second gate preparation means each further include time delay means for delaying the producing of the respective first and second gate signals.

5. Apparatus according to any of claims 1, 2 or 3 further including sensor drive means for operating each of said radiant sensor means at mutually exclusive times, and means for sampling and holding the signals produced by the respective radiant sensor means.

6. A detector for detecting objects in each of two paths along which the objects may travel comprising: first and fourth radiant sensor means focused to receive radiation reflected from opposite sides of an object in a first of said paths, and second and third radiant sensor means focused to receive radiation reflected from opposite sides of an object in a second of said paths, said first radiant sensor means being so disposed and arranged adjacent said second path as to receive radiation reflected from objects in said first path only when no object is present in said second path, and said third radiant sensor means being so disposed and arranged adjacent said first path as to receive radiation reflected from objects in said second path only when no object is present in said first path; first threshold means responsive to said first and second radiation sensors for establishing a first threshold signal and second threshold means responsive to said third and fourth radiation sensors for establishing a second threshold signal; first output means responsive to said first radiant sensor means and said first threshold means for indicating the presence of an object in said first path when the signal produced by said first radiant sensor means is no greater than said first threshold signal, and second output means responsive to said third radiant sensor means and said second threshold means for indicating the presence of an object in said second path when the signal produced by said third radiant sensor means is no greater than said second threshold signal.

7. Apparatus according to claim 6 wherein said first threshold means comprises first summing means responsive to said first and second radiant sensor means for summing the signals produced by said first and second radiant sensor means, and first divider means for dividing the signal provided by said first summing means to a predetermined fraction, and said second threshold means comprises second summing means responsive to said third and fourth radiant sensor means for summing the signals produced by said third and fourth sensor means, and second divider means for dividing the signal provided by said second summing means to a predetermined fraction.

8. Apparatus according to either of claims 6 or 7 further including means responsive to operation of both said first and second output means for indicating the simultaneous presence of objects in both of said paths.

* * * * *